Nov. 27, 1951     H. O. SINGHER ET AL     2,576,151
NOVEL METHOD OF TREATING PRODUCTS CONTAINING
SPECIFIC TYPE AB SUBSTANCES
Filed Sept. 13, 1947
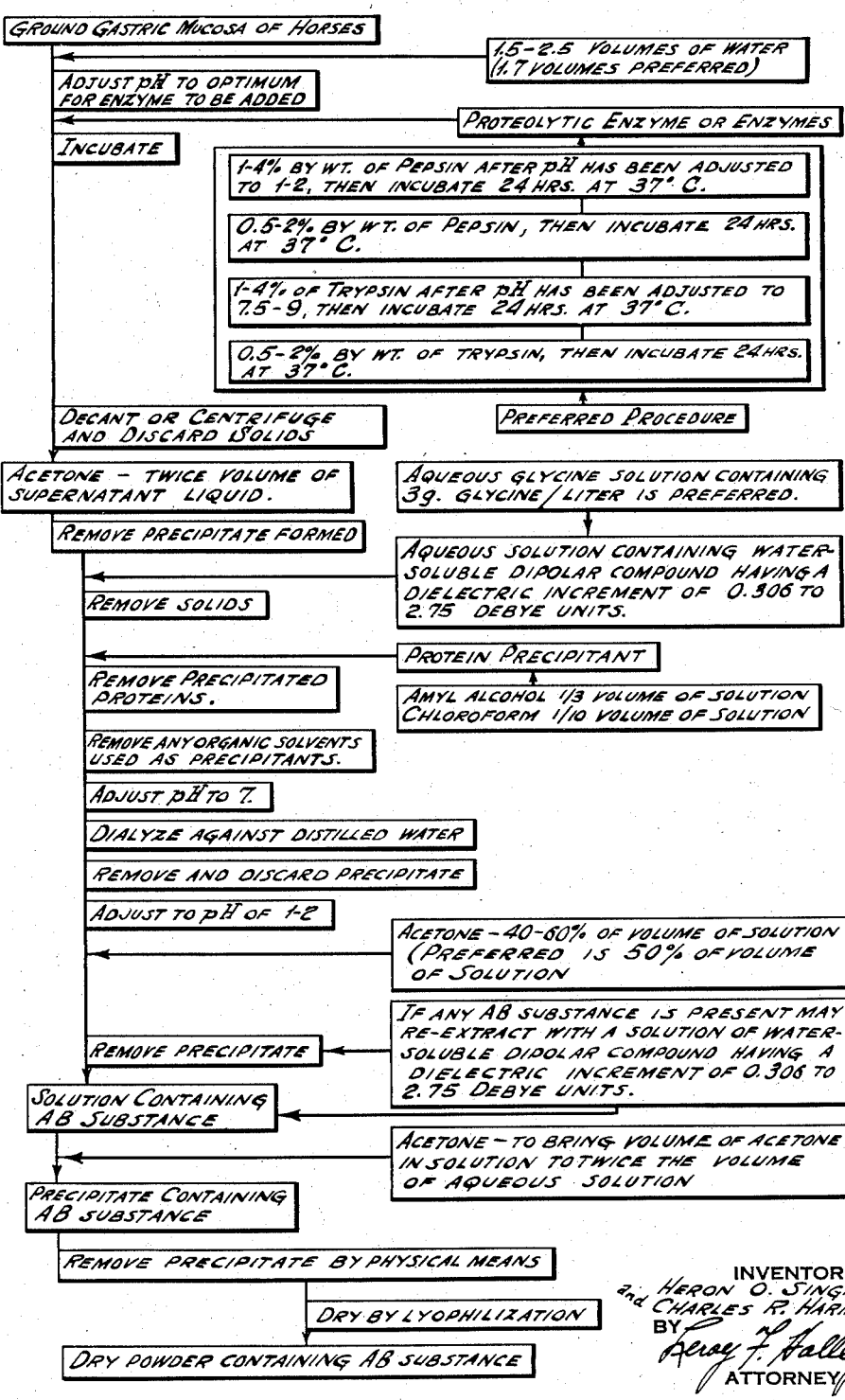
INVENTORS
Heron O. Singher.
and Charles R. Harmison.
BY
ATTORNEY Patented Nov. 27, 1951

2,576,151

UNITED STATES PATENT OFFICE 2,576,151

NOVEL METHOD OF TREATING PRODUCTS CONTAINING SPECIFIC TYPE AB SUBSTANCES

Heron O. Singher, Redhook, N. Y., and Charles R. Harmison, Somerville, N. J., assignors to Ortho Pharmaceutical Corporation, a corporation of New Jersey Application September 13, 1947, Serial No. 773,936

3 Claims. (Cl. 167—74)

This invention relates to novel methods and to steps in the methods for the extraction, concentration, and purification of compositions capable of inhibiting agglutination or hemolysis, and this invention specifically relates to novel methods and steps in the methods for extracting, concentrating, and/or purifying specific type AB substance.

In the early part of this century, it was discovered by Landsteiner that human blood could be grouped into definite types depending upon the presence or absence of different characteristics in the blood. According to these characteristics, the red blood cells of humans are classified into A and B structures. These A and B structures may be readily determined by the use of substances called isoagglutinins, alpha and beta, or preferably called the anti-A agglutinin and the anti-B agglutinin, respectively, which are contained in human blood serum or plasma. It was found that a serum containing one of these isoagglutinins was capable of agglutinating the red blood cells specific for the isoagglutinins in the serum; in other words, red blood cells having a type A substance are agglutinated by a serum having the isoagglutinin alpha or anti-A, and red blood cells having the type B substance are agglutinated by a serum containing the isoagglutinin beta or the anti-B. The anti-A agglutinin in a serum reacts with the A red blood corpuscles but does not react with B red blood corpuscles; and on the other hand, the anti-B agglutinin in a serum reacts with the B red blood corpuscles but does not react with A red blood corpuscles. It therefore became apparent that red blood cells having the factors A and B contained specific substances A and B respectively, and it was established that the specific substance A is characterized by its ability to neutralize the activity of the anti-A agglutinin, while the specific substance B is characterized by its ability to neutralize the activity of the anti-B agglutinin in blood serum.

The presence of the specific substance A may be determined by treating a serum which is known to contain anti-A agglutinin with the substance in question and subsequently adding A cells to the mixture. If this does not result in agglutination, the material in question contains the A substance. The presence of the specific substance B in a material in question may likewise be determined by treating a serum which is known to contain anti-B agglutinin with the material in question and subsequently adding B cells to the mixture. If this does not result in agglutination, the material in question contains the B substance. This method of determining whether a material in question contains the specific substance A and/or the specific substance B is known as the specific inhibition of agglutination. This method enables the presence or absence of the specific substance A and/or the specific substance B to be readily ascertained in a particular material.

Typical sources of the specific substance A are tissues and certain body fluids of some animals known to contain the A factor, and likewise typical sources of the specific substance B are tissues and body fluids of some animals, including human beings, known to contain the B factor, such as saliva, gastric juices, urine, and gastrointestinal mucosa. Some peptone preparations as well as pepsin preparations are known to contain various amounts of the A substance. The B substance is completely absent in such peptone or pepsin preparations. Highly potent A substances can be isolated from the gastric mucosa of hogs, but no trace of the B substance is present in a preparation made from this mucosa. In 1940, Klendshoj and Witebsky, Journal of Experimental Medicine, volume 72, page 663 (1940), isolated a fraction exhibiting B properties from the gastric juices of human beings by the use of multiple alcohol precipitation. The gastric mucosa of the horse has been found to contain the B substance in relatively large amounts associated with the A substance; the product obtained from the gastric mucosa of the horse is therefore a mixture of A and B substances and is commonly termed AB substance. Klendshoj and Witebsky have isolated B substance from gastric juices by a deproteinization with heat followed by a precipitation of the B-substance-containing material with sodium acetate and fractionation with alcohol. W. Thalheimer and S. A. Myron, Blood Substitutes and Blood Transfusions, C. C. Thomas, Springfield, Illinois (1942), obtained the B substance from serum by means of sodium sulphate fractionation. However, the concentration of B substance prepared by previous investigators has been low in concentration and associated with relatively large amounts of undesirable impurities. These disadvantages were limiting factors in its use and in the accuracy of the results obtained through its use.

The type A and B substances are related chemically and are complex in character. Since they are capable of neutralizing the activity of anti-A and anti-B agglutinins present in certain normal sera, they are essential for the neutralization of these agglutinins in anti-Rh sera obtained from mothers of erythroblastatic infants which is to be used in transfusions; Philip Levine, et al., American Journal of Obstetrics and Gynecology, volume 42, pages 925–937, December, 1941. The type A and B substances may also be used for the production of anti-A and anti-B agglutinins by injection into animals or humans.

It has now been discovered that AB substance containing substantially more B than A substance may be prepared in high concentration and purification from the gastric mucosa of the horse by a process which consists of deproteinization followed by a dissolving of the AB substance by the use of a solvent which is preferably an aqueous solution of one or more dipolar compounds, followed by a fractionation with acetone. An organic dipolar compound may be defined as a substance which in solution constitutes an electrically neutral system as the molecules carry a positive charge at one end and a negative charge at the other end. Such a compound known as a dipolar compound or an ampholite may be represented in solution by the formula $+H_3NRCO_2^-$ in which R is that part of the molecule other than the parts carrying the positive and negative charges and is limited only in that it does not contain atoms carrying a positive or negative charge.

The drawing is a descriptively labeled flow sheet which illustrates the procedure of the invention.

In the preparation of the AB substance according to the practice of this invention, fresh horse stomachs and preferably those which have been shown by preliminary tests to have a high degree of activity are employed. The mucosa is stripped from the stomachs, ground up and suspended in from 1.5 to 2.5 volumes of water, the preferred being 1.7 volumes of water. This suspension is adjusted to a pH of from 1 to 2, within which range pepsin has maximal activity and 1 to 4 per cent by weight of pepsin is added. This material is incubated for approximately 24 hours at 37° C. and one-half the amount of pepsin is again added and the material is reincubated for another 24-hour period. The pH is then adjusted to from 7.5 to 9, within which range trypsin has maximal activity, and 1 to 4 per cent by weight of trypsin is added; the material is incubated at 37° C. for approximately 24 hours. One-half the amount of trypsin is again added, and the material is reincubated for another 24-hour period. Any insoluble residual material is removed by physical means, such as decantation or centrifugation, and the supernatant liquid is added to two volumes of cold acetone. At this point in the procedure, the pepsin and trypsin digestions have removed a substantial amount of protein material from the mucosa; the supernatant liquid contains the AB substance in solution, and the addition of acetone causes the formation of a precipitate which contains the AB substance in association with impurities.

The crux of the invention involves the separation of the AB substance from the associated impurities. The AB substance can be dissolved by extraction of the acetone precipitate with a solvent which is preferably an aqueous solution of one or more water-soluble dipolar compounds which when dissolved in water are capable of increasing the value of the dielectric constant of the water corresponding to the increase obtained by dissolving 1 to 9 milligrams of glycine in 1 milliliter of water. These solutions have dielectric increments in the range of 0.306 to 2.75 Debye units. Examples of dipolar compounds which satisfactorily increase the dielectric constant of water are: glycine, alanine, glutamic acid, aspartic acid, glycylglycine, and other low molecular weight amino acids, peptides, and the like. In the preferred procedure the acetone precipitate is extracted with a solution of glycine containing 3 grams of glycine per liter. The residual material is removed by suitable physical means and discarded. The solution may then be subjected to a further procedure for deproteinization, such as shaking with one-third its volume of amyl alcohol and one-tenth its volume of chloroform; a precipitate is formed which is removed by physical means and discarded. The organic solvents are also removed from the aqueous solution and discarded. The aqueous solution is then adjusted to pH 7 and dialyzed against distilled water until diffusion from the solution has decreased substantially; this results in the formation of a precipitate which is removed by physical means. The supernatant liquid contains the AB substance in solution in association with impurities. The supernatant liquid is adjusted to a pH of from 1 to 2, and an amount of acetone equal to 40–60% and preferably 50% of the volume of the solution is added; a precipitate of inactive material is formed which is removed by physical means and tested for activity. If the precipitate contains any substantial amount of AB substance, it is re-extracted with glycine solution according to the above procedure, and the extract is added to the supernatant from which the precipitate was obtained.

The supernatant containing the AB substance may be used as such or the AB substance may be precipitated from the solution by the addition of a suitable solvent such as acetone, in which the AB substance is insoluble. The precipitation of the AB substance from the solution may be done by adding sufficient acetone to the solution to bring the concentration of acetone to 2 volumes for 1 volume of solution; this results in the formation of a precipitate which contains the AB substance in high concentration, and the precipitate is removed by physical means and dried by any satisfactory method, such as lyophilization.

In order that those skilled in the art may better understand how the present invention may be carried into effect, the following example is given by way of illustration, and not by way of limitation.

Fifty milligram samples of the gastric mucosa were taken from 142 hores stomachs, and each sample was extracted with 5 ml. of an 0.9 per cent saline and tested for its content of A and AB substances. The horse stomachs showing relatively high concentration of AB substance were scraped, and 12.5 kilograms of mucosa were obtained and added to 22.1 liters of water. The pH of the water-mucosa suspension was adjusted with concentrated hydrochloric acid to 2, and the pH was maintained at 2 throughout the subsequent pepsin digestion with further additions of acid if necessary. Two per cent by weight of pepsin, on the basis of the weight of the mucosa, was added and the whole was allowed to incubate at 37° C. for 21 hours. A further amount of 1 per cent by weight of pepsin based on the weight of the mucosa was added, and the whole was digested at 37° C. for 24 hours. The pH was then adjusted to 9 by the addition of twice normal sodium hydroxide, and the pH throughout the subsequent trypsin digestion was maintained between 8.5 and 9 by the addition of twice normal sodium hydroxide when necessary. Two per cent by weight of trypsin based on the weight of mucosa was added, and the whole was digested at 37° C. for 20 hours. A further amount of 1 per cent by weight of trypsin based on the weight of the mucosa was added, and the digestion was continued for another 24 hours at 37° C. Undigested tissue and insoluble material were removed from the solution by decantation, and the supernatant liquid was centrifuged to remove all insoluble substances. The centrifugate was added with stirring to 84 liters of cold acetone and allowed to stand overnight, after which time the supernatant was siphoned from the precipitate and discarded. The precipitate was added to 10 liters of water containing 3 grams of glycine per liter, and insoluble material was removed by centrifugation. 3.8 liters of amyl alcohol and 1.3 liters of chloroform were added to the centrifugate which amounted to 11.3 liters; this mixture was vigorously shaken for one hour while the solution was maintained at a temperature below 5° C.; then the mixture was placed in a separatory funnel and the solvents were allowed to separate from the aqueous liquid. The lower layer in the funnel, containing the B substance in solution, was drawn off and centrifuged. The centrifugate was adjusted to pH 7 by the addition of concentrated hydrochloric acid and dialyzed against running water until diffusion into the running water had diminished substantially. This resulted in the formation of a precipitate in the solution being dialyzed, and this precipitate was removed by centrifugation. The centrifugate had a volume of 12.9 liters and was brought to a pH of 1.5 by the addition of normal hydrochloric acid. An amount of acetone corresponding to one-half the volume of the solution was added through a capillary with vigorous stirring. A precipitate was formed upon the addition of acetone and was allowed to settle; the supernatant liquid was drawn off and clarified by filtering. Acetone amounting to twice the volume of this supernatant liquid was added and a precipitate which was high in concentration of AB substance was formed; this precipitate weighed 34.5 grams.

The activity of the AB substance was determined by the standard method of specific inhibition of the isoagglutinins corresponding to the antigen present in the test material.

What is claimed is:

1. The method for extracting specific AB substance from horse gastric mucosa comprising treating said horse gastric mucosa with an aqueous solution of a compound selected from the group consisting of amino acids, and dipeptids; said aqueous solution having a concentration such that the dielectric increment thereof is in the range of 0.306 to 2.75 Debye units.

2. The method for extracting specific type AB substances from horse gastric mucosa comprising treating horse gastric mucosa with an aqueous solution of an amino acid, said solution having a dielectric increment in the range of from 0.306 to 2.75 Debye units.

3. The method for extracting specific type AB substance from horse gastric mucosa comprising treating horse gastric mucosa with an aqueous solution of glycine, the ratio of glycine to water in said solution being in the range of 1 to 9 milligrams of glycine in each milliliter of water.

HERON O. SINGHER.
CHARLES R. HARMISON.

REFERENCES CITED

The following references are of record in the file of this patent:

UNITED STATES PATENTS

| Number | Name | Date |
|---|---|---|
| 2,290,146 | Witebsky | July 14, 1942 |

FOREIGN PATENTS

| Number | Country | Date |
|---|---|---|
| 479,487 | Great Britain | Feb. 4, 1938 |

OTHER REFERENCES

Morgan in British Journal of Experimental Pathology, vol. 24, April 1943, pages 41–49, 167–78–B.

Goebel in J. Exptl. Med., vol. 68 (1938), pages 221–227, 167–78–B.

Oliver-Gonzales in J. Infect. Dis., vol. 74 (2), pages 81–84 (1944), 167–78–B.